US009086144B2

(12) United States Patent
Takahashi et al.

(10) Patent No.: US 9,086,144 B2

(45) Date of Patent: Jul. 21, 2015

(54) CONTINUOUSLY VARIABLE TRANSMISSION AND HYDRAULIC PRESSURE CONTROL METHOD THEREFOR

(71) Applicants: JATCO LTD., Fuji-shi, Shizuoka (JP); NISSAN MOTOR CO., LTD., Yokohama-shi, Kanagawa (JP)

(72) Inventors: Seiichiro Takahashi, Isehara (JP); Takashi Eguchi, Machida (JP); Takahiro Kobayashi, Higashikurume (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/388,672

(22) PCT Filed: Feb. 21, 2013

(86) PCT No.: PCT/JP2013/054390

§ 371 (c)(1),
(2) Date: Sep. 26, 2014

(87) PCT Pub. No.: WO2013/145972

PCT Pub. Date: Oct. 3, 2013

(65) Prior Publication Data

US 2015/0051032 A1 Feb. 19, 2015

(30) Foreign Application Priority Data

Mar. 28, 2012 (JP) ................................ 2012-074922

(51) Int. Cl.

| | |
|---|---|
| ***F16H 61/04*** | (2006.01) |
| ***F16H 61/662*** | (2006.01) |
| *F16H 59/42* | (2006.01) |

(52) U.S. Cl.

CPC .......... *F16H 61/66227* (2013.01); *F16H 61/04* (2013.01); *F16H 61/66259* (2013.01); *F16H 61/66272* (2013.01); *F16H 59/42* (2013.01); *F16H 2059/425* (2013.01)

(58) Field of Classification Search

CPC ......... F16H 7/02; F16H 61/04; F16H 61/662; F16H 61/66272

USPC ........................................................... 701/51

See application file for complete search history.

(56) References Cited

U.S. PATENT DOCUMENTS

| | | | | |
|---|---|---|---|---|
| 5,790,968 | A * | 8/1998 | Kashiwabara et al. | 701/51 |
| 6,625,531 | B2 * | 9/2003 | Yasuoka et al. | 701/51 |
| 2002/0019692 | A1 | 2/2002 | Yasuoka et al. | |
| 2007/0288151 | A1 * | 12/2007 | Kadono et al. | 701/54 |
| 2010/0222971 | A1 * | 9/2010 | Takahashi et al. | 701/51 |

FOREIGN PATENT DOCUMENTS

| | | | |
|---|---|---|---|
| JP | 09-207628 | A | 8/1997 |
| JP | 11-020512 | A | 1/1999 |
| JP | 2002-036918 | A | 2/2002 |
| JP | 2006-307925 | A | 11/2006 |
| JP | 2009-208751 | A | 9/2009 |

* cited by examiner

*Primary Examiner* — Edwin A Young

(74) *Attorney, Agent, or Firm* — Foley & Lardner LLP

(57) ABSTRACT

A transmission controller detects a rotation speed of an input shaft, calculates an inertia torque input to a continuously variable transmission based on a change ratio of the detected rotation speed, obtains a positive inertia torque by extracting a positive portion from the calculated inertia torque, and corrects pulley pressures based on the extracted positive inertia torque.

9 Claims, 5 Drawing Sheets

CONTINUOUSLY VARIABLE TRANSMISSION AND HYDRAULIC PRESSURE CONTROL METHOD THEREFOR

TECHNICAL FIELD

The present invention relates to hydraulic pressure control for a continuously variable transmission.

BACKGROUND ART

A continuously variable transmission (hereinafter referred to as a "CVT") continuously changes a speed ratio by changing widths of grooves in a primary pulley and a secondary pulley around which a belt is wound. Torque transmittable by the CVT is determined by a force by which the primary pulley and the secondary pulley thrust the belt (hereinafter referred to as a "pulley thrust force"), and the pulley thrust force is determined by a primary pressure and a secondary pressure supplied to the primary pulley and the secondary pulley.

Therefore, the CVT makes transmittable an input torque to the CVT determined by an engine torque and a torque converter torque ratio, without slippage of the belt, by controlling the primary pressure and the secondary pressure such that the transmittable torque does not become smaller than the input torque.

Furthermore, if an input rotation speed of the CVT changes, an inertia torque is input to the CVT, and torque that the CVT actually needs to transmit increases or decreases accordingly. Therefore, the transmittable torque can be ensured, without excess or deficiency, by calculating the inertia torque input to the CVT and correcting the primary pressure and the secondary pressure in accordance with the calculated inertia torque.

It should be noted that JP 11-20512A describes an inertia torque input to a CVT and a method for calculating the same.

SUMMARY OF INVENTION

However, if a primary pressure and a secondary pressure are corrected in accordance with, an inertia torque input to a CVT, there is a possibility that an input rotation speed of the CVT undergoes hunting for the following reason.

If the inertia torque is obtained based on a change in the input rotation speed of the CVT and the primary pressure and the secondary pressure are corrected in accordance with the calculated inertia torque, there is a case where correction of the primary pressure and the secondary pressure adversely triggers a change in the input rotation speed of the CVT due to a shift in a control timing. In this case, a change in the input rotation speed of the CVT and consequent correction of the primary pressure and the secondary pressure are repeated.

An object of the present invention, made in view of the foregoing technical problem, is to suppress hunting of an input rotation speed of a CVT in correction of a primary pressure and a secondary pressure in accordance with an inertia torque.

According to one aspect of the present invention, a continuously variable transmission is provided. The continuously variable transmission includes: a primary pulley joined to a driving source via an input shaft; a secondary pulley joined to an output shaft; a belt that is wound around both of the pulleys and transmits power; and a control device that controls pulley pressures supplied to both of the pulleys so as to adjust a speed ratio between both of the pulleys by changing widths of grooves in both of the pulleys based on a target input shaft rotation speed that has been set in accordance with an operating condition, of the driving source. The continuously variable transmission detects a rotation speed of the input shaft, calculates an inertia torque input to the continuously variable transmission based on a change ratio of the detected rotation speed, obtains a positive inertia torque by extracting a positive portion from the calculated inertia torque, and corrects the pulley pressures based on the extracted positive inertia torque.

According to another aspect of the present invention, a hydraulic pressure control method for a continuously variable transmission is provided. The continuously variable transmission includes: a primary pulley joined to a driving source via an input shaft; a secondary pulley joined to an output shaft; a belt that is wound around both of the pulleys and transmits power; and a control device that controls pulley pressures supplied to both of the pulleys so as to adjust a speed ratio between both of the pulleys by changing widths of grooves in both of the pulleys based on a target input shaft rotation speed that has been set in accordance with an operating condition of the driving source. The hydraulic pressure control method detects a rotation speed of the input shaft, calculates an inertia torque input to the continuously variable transmission based on a change ratio of the detected rotation speed, obtains a positive inertia torque by extracting a positive portion from the calculated inertia torque, and corrects the pulley pressures based on the extracted positive inertia torque.

According to the foregoing aspects, an inertia torque value calculated from a change ratio of an actual rotation speed is not used as-is in correction of a primary pressure and a secondary pressure. Instead, only a positive portion of the calculated inertia torque value is used. In this way, the primary pressure and the secondary pressure are always corrected to increase, and the correction does not cause a hydraulic pressure to decrease beyond necessity. Therefore, the belt does not slip.

Furthermore, a decrease ratio of a calculated corrective inertia torque value is restricted in a portion where a change ratio of an actual input rotation speed does not correspond to a target rotation speed change ratio and only a rotation change speed changes. In this way, the calculated corrective inertia torque value does not conform to hunting of the actual input rotation speed of the continuously variable transmission, and persistence of hunting of the actual input rotation speed can be suppressed.

An embodiment and advantages of the present invention will be described below in detail with reference to the attached drawings.

DESCRIPTION OF EMBODIMENTS

Figure 1:
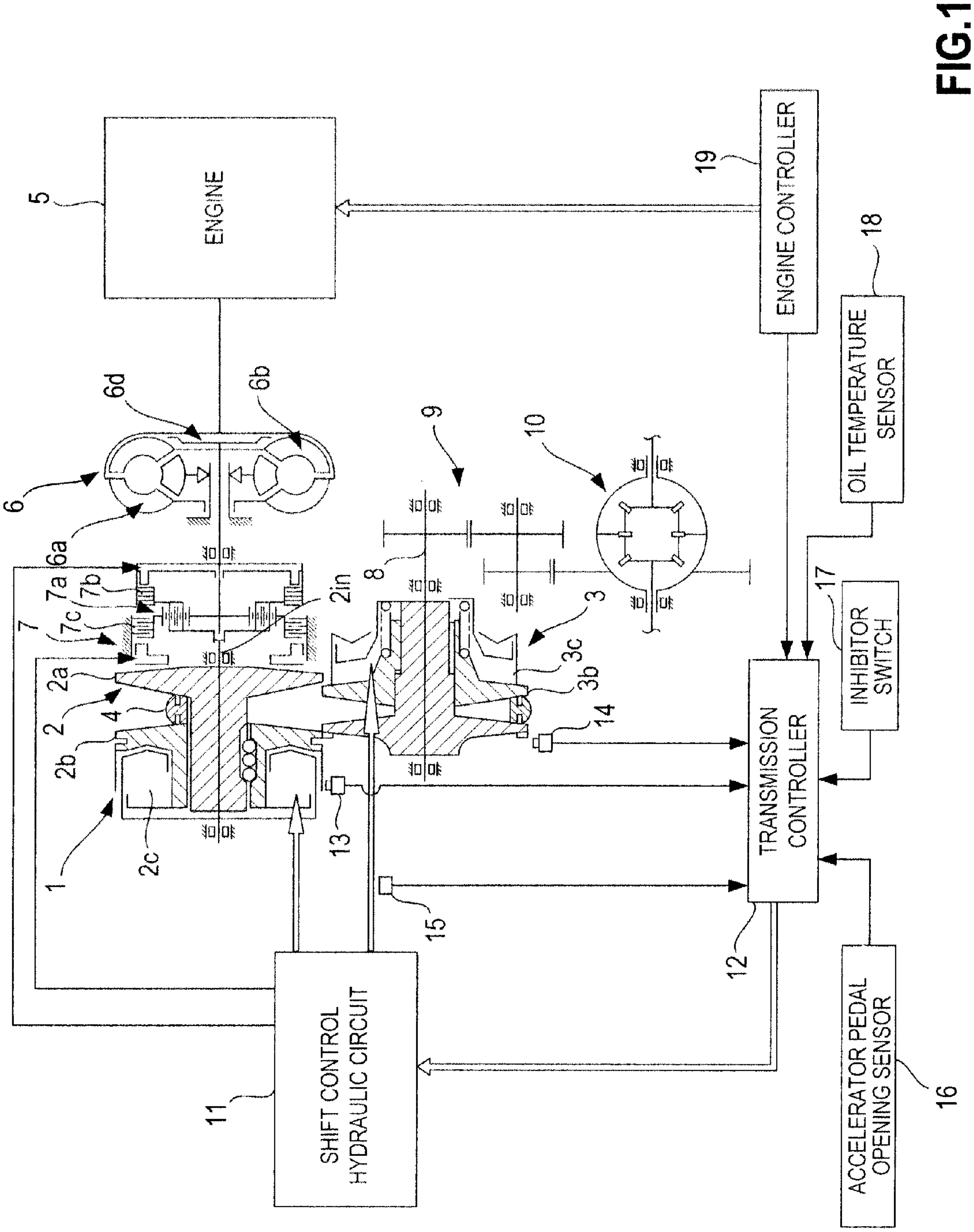
FIG. 1 is a general configuration diagram of a continuously variable transmission.

FIG. 1 shows a general configuration of a continuously variable transmission (hereinafter referred to as a "CVT") 1. A primary pulley 2 and a secondary pulley 3 are disposed such that grooves in both pulleys 2 and 3 are aligned. A belt 4 is wound around the grooves in the pulleys 2 and 3. An engine 5 is disposed coaxially with the primary pulley 2. A torque converter 6, a forward/reverse switching mechanism 7, and an input shaft 2 in are interposed between the engine 5 and the primary pulley 2 in the stated order from the side of the engine 5.

The torque converter 6 includes a pump impeller 6*a* joined to an output shaft of the engine 5, a turbine runner 6*b* joined to an input shaft of the forward/reverse switching mechanism 7, a stator 6*c*, and a lock-up clutch 6*d*.

The forward/reverse switching mechanism 7 includes a double-pinion planetary gear set 7*a* as a main constituent element, and a sun gear thereof is coupled to the turbine runner 6*b* of the torque converter 6 while a carrier thereof is coupled to the primary pulley 2. The forward/reverse switching mechanism 7 further includes a forward clutch 7*b* for directly coupling the sun gear and the carrier of the double-pinion planetary gear set 7*a*, and a reverse brake 7*c* for fixing a ring gear of the double-pinion planetary gear set 7*a*. When the forward clutch 7*b* is engaged, input rotation from the engine 5 via the torque converter 6 is transmitted to the primary pulley 2 as-is. When the reverse brake 7*c* is engaged, input rotation from the engine 5 via the torque converter 6 is reversed and transmitted to the primary pulley 2.

The rotation of the primary pulley 2 is transmitted to the secondary pulley 3 via the belt 4. The rotation of the secondary pulley 3 is transmitted to drive wheels, not shown, via an output shaft 8, a gear set 9, and a differential gear device 10.

In order to make a speed ratio between the primary pulley 2 and the secondary pulley 3 changeable during the above-described power transmission, out of conical plates forming the groove in each of the primary pulley 2 and the secondary pulley 3, one is a fixed conical plate 2*a*, 3*a*, while the other conical plate 2*b*, 3*b* is a movable conical plate displaceable in an axial direction.

These movable conical plates 2*b* and 3*b* are thrust toward the fixed conical plates 2*a* and 3*a* as a result of supplying a primary pressure Ppri and a secondary pressure Psec, which arc produced using a line pressure as a source pressure, to a primary pulley chamber 2*c* and a secondary pulley chamber 3*c*. Consequently, the belt 4 is frictionally engaged with the conical plates, and power is transmitted between the primary pulley 2 and the secondary pulley 3.

Shift is performed by changing the widths of the grooves in both pulleys 2 and 3 using a differential pressure between the primary pressure Ppri and the secondary pressure Psec so as to continuously change the radii of arcs around which the belt 4 is wound on the pulleys 2 and 3.

A shift control hydraulic circuit 11 controls the primary pressure Ppri and the secondary pressure Psec, together with hydraulic pressures supplied to the forward clutch 7*b* that is engaged when a forward driving range is selected, and to the reverse brake 7*c* that is engaged when a reverse driving range is selected. The shift control hydraulic circuit 11 performs control in response to a signal from a transmission controller 12.

The transmission controller 12 receives the following as input: a signal from an input rotation speed sensor 13 that detects an actual input rotation speed Nin of the CVT 1; a signal from a vehicle speed sensor 14 that detects an output rotation speed of the CVT 1, that is to say, a vehicle speed VSP; a signal from a secondary pressure sensor 15 that detects the secondary pressure Psec; a signal from an accelerator pedal opening sensor 16 that detects an accelerator pedal opening APO; a selected range signal from an inhibitor switch 17 that detects a selector lever position; a signal from an oil temperature sensor 18 that detects an oil temperature TMPt of the CVT 1; and a signal from an engine controller 19 controlling the engine 5 regarding an operating condition of the engine 5 (an engine speed Ne, an engine torque, a fuel injection period, a cooling water temperature TMPe, and the like).

Figure 2:
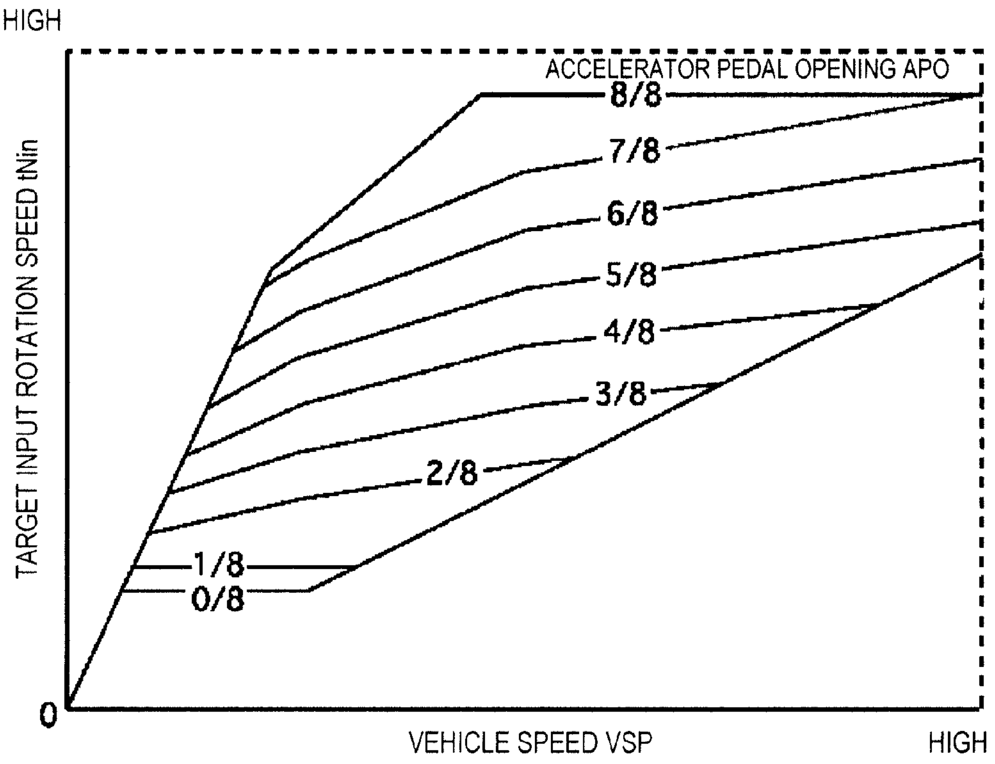
FIG. 2 shows a shift map for the continuously variable transmission.

The transmission controller 12 sets a target input rotation speed tNin corresponding to the vehicle speed VSP and the accelerator pedal opening APO with reference to a shift map shown in FIG. 2, and controls the primary pressure Ppri and the secondary pressure Psec such that the actual input rotation speed Nin tracks and, reaches the target input rotation speed tNin, and so as to obtain a pulley thrust force necessary for transmitting a base input torque of the CVT 1 determined by the engine torque and a torque converter torque ratio.

Furthermore, when the actual input rotation speed Nin decreases, e.g., when the CVT 1 is shifted up, an inertia torque (a positive value) input to the CVT 1 makes torque that the CVT 1 needs to transmit larger than the base input torque to the CVT 1. Therefore, the transmission controller 12 prevents slippage of the belt 4 by calculating the inertia torque and increasing the primary pressure Ppri and the secondary pressure Psec in accordance with the calculated value in the course of correction.

In contrast, when the actual input rotation speed Nin increases, e.g., when the CVT 1 is shifted down, an inertia torque (a negative value) input to the CVT 1 makes torque that the CVT 1 needs to transmit smaller than the base input torque to the CVT 1. Therefore, in this case, the primary pressure Ppri and the secondary pressure Psec can be decreased in the course of correction.

However, if a timing at which the inertia torque turns into a negative value does not coincide with a timing of the decrease in the primary pressure Ppri and the secondary pressure Psec through the correction, there is a possibility that the belt 4 slips due to shortage in the pulley thrust force. For this reason, the primary pressure Ppri and the secondary pressure Psec are not decreased in the course of correction.

In general, in order to cause the actual input rotation speed Nin to track and reach the target input rotation speed tNin, a target rotation speed change ratio that serves as a target value of a change ratio of the actual input rotation speed is set, and control is performed such that the change ratio of the actual input rotation speed tracks the target rotation change ratio at the time of shift. At this time, the change ratio of the actual input rotation speed may repeatedly increase and decrease even though the target rotation speed change ratio does not change. If this occurs especially during a decrease in the actual input rotation speed Nin of the CVT 1, a decrease ratio of a calculated inertia torque value (a positive value) used in the correction of the primary pressure Ppri and the secondary pressure Psec is restricted, and the primary pressure Ppri and the secondary pressure Psec are increased in accordance with the restricted value (a calculated corrective inertia torque value) in the course of correction. In this way, the calculated inertia torque value becomes less likely to conform to hunting of the actual input rotation speed Nin through the correction of the primary pressure Ppri and the secondary pressure Psec. Consequently, fluctuations in corrected values of the primary pressure Ppri and the secondary pressure Psec become non-persistent. Hence, persistence of hunting can be suppressed.

Figure 3:
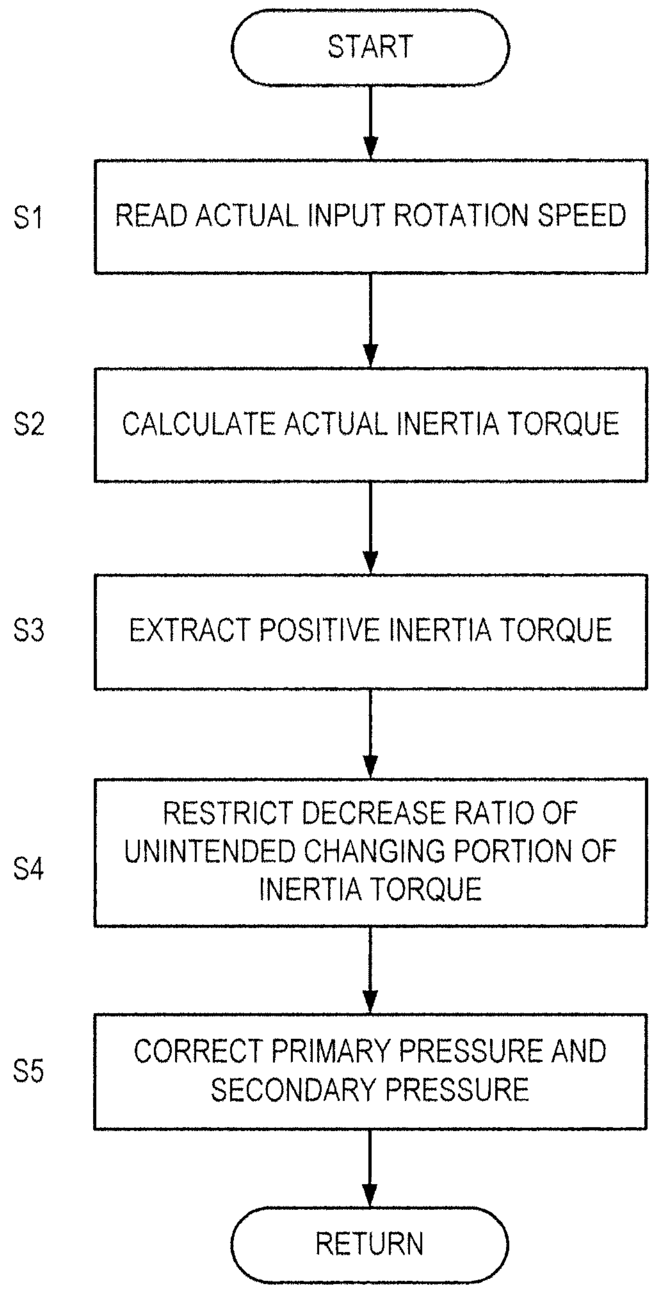
FIG. 3 is a flowchart showing a substance of control for correcting a primary pressure and a secondary pressure in accordance with an inertia torque.
Figure 4A:
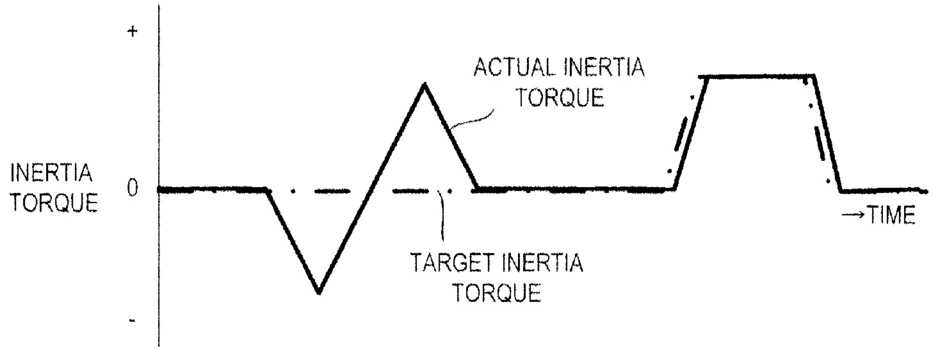
FIG. 4A shows an actual inertia torque.
Figure 4B:
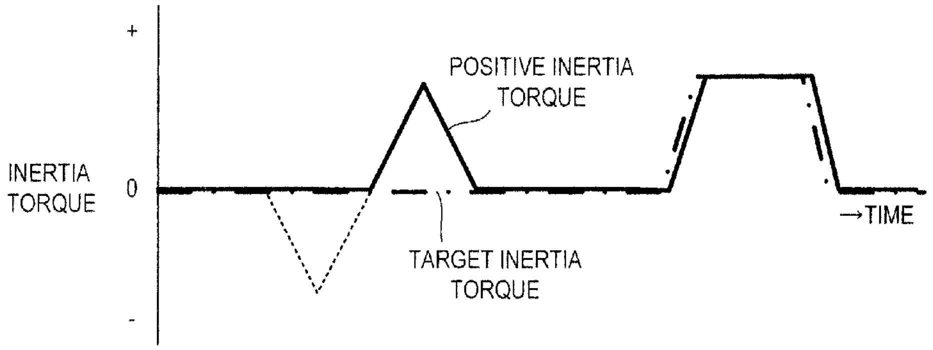
FIG. 4B shows a positive inertia torque.
Figure 4C:
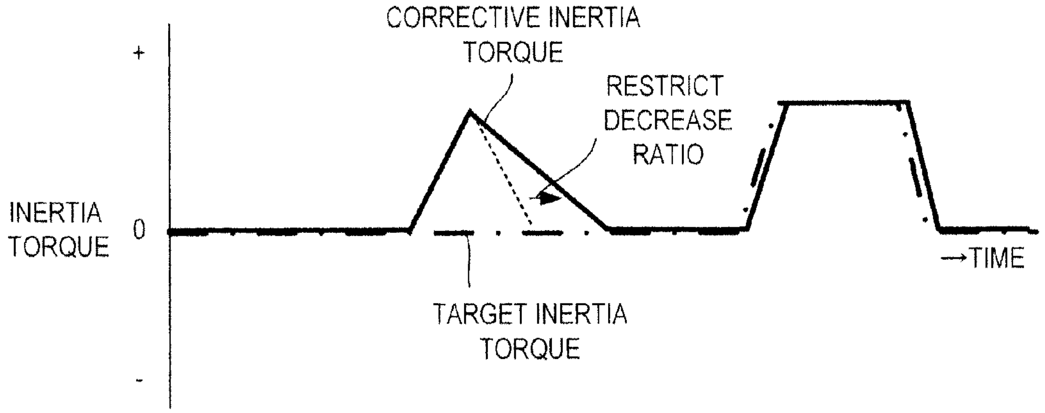
FIG. 4C shows a corrective inertia torque.

FIG. 3 is a flowchart showing a substance of control performed by the transmission controller 12 for correcting the primary pressure Ppri and the secondary pressure Psec in accordance with a calculated inertia torque value. FIGS. 4A to 4C are diagrams for explaining a calculated corrective inertia torque value that is used in the correction of the primary pressure Ppri and the secondary pressure Psec. With reference to these drawings, the following describes control for correcting the primary pressure Ppri and the secondary pressure Psec in accordance with the inertia torque.

First, in S1, the transmission controller 12 reads the actual input rotation speed Nin detected by the input rotation speed sensor 13.

In S2, the transmission controller 12 calculates the actual inertia torque input to the CVT 1. An actual inertia torque value can be calculated by multiplying the moment of inertia around an axis of the primary pulley 2 by a change ratio of the actual input rotation speed Nin.

A solid line in FIG. 4A schematically indicates the actual inertia torque value thus calculated. In FIG. 4A, a dash-and-dot line indicates a calculated target inertia torque value obtained by multiplying a target rotation speed change ratio, which is a target value of a change ratio of an input rotation speed set based on a difference between the target input rotation speed tNin and the actual input rotation speed Nin, by the moment of inertia around the axis of the primary pulley 2.

In S3, the transmission controller 12 extracts only a portion that takes a positive value from the actual inertia torque value calculated in S2, and uses the extracted portion as a calculated positive inertia torque value.

A solid line in FIG. 4B indicates the calculated positive inertia torque value obtained by extracting only a portion that takes a positive value from the calculated actual inertia torque value.

In S4, the transmission controller 12 identifies, from the calculated positive inertia torque value obtained in S3, a calculated inertia torque value changing portion attributed to a fluctuation in the change ratio of the input rotation speed, and obtains a calculated corrective inertia torque value by restricting a decrease ratio of the calculated inertia torque value changing portion that has been identified.

The calculated inertia torque value changing portion denotes a portion which does not correspond to the target input rotation speed tNin, and at which only the actual input rotation speed Nin fluctuates relative to the target input rotation speed tNin, due to a fluctuation in the speed ratio. Specifically, the calculated inertia torque value changing portion is a portion other than the following portions: a portion where neither the target rotation speed change ratio nor the change ratio of the actual input rotation speed Nin changes relative to the positive inertia torque value calculated from the actual input rotation speed; and a portion where the target rotation speed change ratio changes and the change ratio of the actual input rotation speed Nin changes to track the changed target rotation speed change ratio.

Furthermore, restricting the decrease ratio means restricting the decrease ratio of the calculated inertia torque value (=change ratio×−1) to a predetermined lower limit value when it is larger than the lower limit value. If the decrease ratio of the calculated inertia torque value becomes larger than the predetermined lower limit value, pulley hydraulic pressures fluctuate because the primary pressure Ppri and the secondary pressure Psec corrected by the calculated inertia torque value are calculated so as to track the decrease ratio of the calculated inertia torque value. This results in persistence of hunting of the actual input rotation speed Nin of the CVT 1. For this reason, the lower limit value is set such that hunting of the actual input rotation speed Nin of the CVT 1 is less likely to be persistent.

A solid line in FIG. 4C indicates the calculated corrective inertia torque value obtained by restricting the decrease ratio of the calculated inertia torque value changing portion in the calculated positive inertia torque value. The calculated corrective inertia torque value changes moderately in the portion with the restricted decrease ratio.

In S5, the transmission controller 12 corrects the primary pressure Ppri and the secondary pressure Psec based on the calculated corrective inertia torque value obtained in S4. As the calculated corrective inertia torque value is a positive value, torque that the CVT 1 needs to transmit increases accordingly. Therefore, the transmission controller 12 increases the primary pressure Ppri and the secondary pressure Psec in the course of correction.

A description is now given of the operational effects achieved by performing the above-described control for correcting the primary pressure Ppri and the secondary pressure Psec in accordance with the calculated inertia torque value.

In the present embodiment, the calculated actual inertia torque value is not used as-is in the correction of the primary pressure Ppri and the secondary pressure Psec, but only a positive portion of the calculated actual inertia torque value is used (S3). In this way, the primary pressure Ppri and the secondary pressure Psec are always corrected to increase, and the correction does not cause the belt 4 to slip.

Furthermore, regarding the calculated corrective inertia torque value used in the correction of the primary pressure Ppri and the secondary pressure Psec, the decrease ratio thereof is restricted in a portion where the change ratio of the actual input rotation speed Nin fluctuates without corresponding to the target rotation speed change ratio. In this way, fluctuations in the pulley hydraulic pressures can be suppressed, the stability of control can be raised, and the persistence of hunting of the actual input rotation speed Nin of the CVT 1 can be suppressed (S4).

The decrease ratio is restricted only in a portion where the change ratio of the actual input rotation speed Nin changes without corresponding to the target rotation speed change ratio. This can minimize a friction increase and degradation in fuel economy caused by the difficulty in decreasing the corrected primary pressure Ppri and secondary pressure Psec due to the restriction on the decrease ratio of the calculated corrective inertia torque value.

This concludes the description of the embodiment of the present invention. It should be noted that the above-described embodiment merely illustrates one application example of the present invention, and is not intended to limit a technical scope of the present invention to specific configurations of the above-described embodiment.

The present application claims the benefit of priority from Japanese Patent Application No. 2012-74922, filed in the Japan Patent Office on Mar. 28, 2012, the disclosure of which is incorporated herein by reference in its entirety.

The invention claimed is:

1. A continuously variable transmission comprising:

a primary pulley joined to a driving source via an input shaft;

a secondary pulley joined to an output shaft;

a belt that is wound around both of the pulleys and transmits power; and a control device that controls pulley pressures supplied to both of the pulleys so as to adjust a speed ratio between both of the pulleys by changing widths of grooves in both of the pulleys based on a target input shaft rotation speed that has been set in accordance with an operating condition of the driving source, wherein the control device is configured to:

detect a rotation speed of the input shaft;

calculate an inertia torque input to the continuously variable transmission based on a change ratio of the detected rotation speed;

obtain a positive inertia torque by extracting a positive portion from the calculated inertia torque; and correct the pulley pressures based on the extracted positive inertia torque.

2. The continuously variable transmission according to claim 1, wherein a target rotation speed change ratio, which is a target value of a change ratio of the rotation speed of the input shaft, is set so as to cause an actual rotation speed of the input shaft to reach the target input rotation speed, and the control device is configured to extract the positive portion of the calculated inertia torque relative to a target inertia torque calculated based on the target rotation speed change ratio.

3. The continuously variable transmission according to claim 1, wherein a target rotation speed change ratio, which is a target value of a change ratio of the rotation speed of the input shaft, is set so as to cause an actual rotation speed of the input shaft to reach the target input rotation speed, and the control device is configured to:

obtain a corrective inertia torque by restricting a decrease ratio of a portion of the positive inertia torque where the change ratio of the input rotation speed changes without corresponding to a change ratio of the target input rotation speed, and correct the pulley pressures to increase as the corrective inertia torque increases.

4. A hydraulic pressure control method for a continuously variable transmission that includes: a primary pulley joined to a driving source via an input shaft; a secondary pulley joined to an output shaft; a belt that is wound around both of the pulleys and transmits power; and a control device that controls pulley pressures supplied to both of the pulleys so as to adjust a speed ratio between both of the pulleys by changing widths of grooves in both of the pulleys based on a target input shaft rotation speed that has been set in accordance with an operating condition of the driving source, the hydraulic pressure control method comprising:

detecting a rotation speed of the input shaft;

calculating an inertia torque input to the continuously variable transmission based on a change ratio of the detected rotation speed;

obtaining a positive inertia torque by extracting a positive portion from the calculated inertia torque; and correcting the pulley pressures based on the extracted positive inertia torque.

5. The hydraulic pressure control method according to claim 4, wherein a target rotation speed change ratio, which is a target value of a change ratio of the rotation speed of the input shaft, is set so as to cause an actual rotation speed of the input shaft to reach the target input rotation speed, and the positive portion of the calculated inertia torque relative to a target inertia torque calculated based on the target rotation speed change ratio is extracted.

6. The hydraulic pressure control method according to claim 4, wherein a target rotation speed change ratio, which is a target value of a change ratio of the rotation speed of the input shaft, is set so as to cause an actual rotation speed of the input shaft to reach the target input rotation speed, a corrective inertia torque is obtained by restricting a decrease ratio of a portion of the positive inertia torque where the change ratio of the input rotation speed changes without corresponding to a change ratio of the target input rotation speed, and the pulley pressures are corrected to increase as the corrective inertia torque increases.

7. A continuously variable transmission comprising:

a primary pulley joined to a driving source via an input shaft;

a secondary pulley joined to an output shaft;

a belt that is wound around both of the pulleys and transmits power; and a control device that controls pulley pressures supplied to both of the pulleys so as to adjust a speed ratio between both of the pulleys by changing widths of grooves in both of the pulleys based on a target input shall rotation speed that has been set in accordance with an operating condition of the driving source, wherein the control device includes:

rotation speed detection means for detecting a rotation speed of the input shaft;

calculation means for calculating an inertia torque input to the continuously variable transmission based on a change ratio of the detected rotation speed;

extraction means for obtaining a positive inertia torque by extracting a positive portion from the calculated inertia torque; and correction means for correcting the pulley pressures based on the extracted positive inertia torque.

8. The continuously variable transmission according to claim 7, wherein a target rotation speed change ratio, which is a target value of a change ratio of the rotation speed of the input shaft, is set so as to cause an actual rotation speed of the input shaft to reach the target input rotation speed, and the extraction means is configured to extract the positive portion of the calculated inertia torque relative to a target inertia torque calculated based on the target rotation speed change ratio.

9. The continuously variable transmission according to claim 7, wherein a target rotation speed change ratio, which is a target value of a change ratio of the rotation speed of the input shaft, is set so as to cause an actual rotation speed of the input shaft to reach the target input rotation speed, the continuously variable transmission further comprises correction calculation means for obtaining a corrective inertia torque by restricting a decrease ratio of a portion of the positive inertia torque where the change ratio of the input rotation speed changes without corresponding to a change ratio of the target input rotation speed, and the correction means is configured to correct the pulley pressures to increase as the corrective inertia torque increases.

* * * * *